United States Patent [19]

Tomita

[11] Patent Number: 4,832,403
[45] Date of Patent: May 23, 1989

[54] MOTOR-DRIVEN SEAT
[75] Inventor: Toshihiko Tomita, Hiroshima, Japan
[73] Assignee: Mazda Motor Corporation, Hiroshima, Japan
[21] Appl. No.: 85,174
[22] Filed: Aug. 14, 1987
[30] Foreign Application Priority Data Aug. 22, 1986 [JP] Japan .................... 61-197773

[51] Int. Cl.⁴ .............................. B60N 1/02
[52] U.S. Cl. .................. 297/330; 297/341; 297/344
[58] Field of Search ........... 297/330, 340, 344, 361, 297/362, 341; 324/504

[56] References Cited

U.S. PATENT DOCUMENTS

| | | | |
|---|---|---|---|
| 2,929,439 | 3/1960 | Tanaka et al. | 297/330 X |
| 3,663,939 | 5/1972 | Olsson | 324/504 X |
| 4,299,316 | 11/1981 | Reinmoeller | 297/330 X |
| 4,366,983 | 1/1983 | Klueting et al. | 297/330 X |
| 4,432,583 | 2/1984 | Russo et al. | 297/330 |
| 4,467,252 | 8/1984 | Takeda et al. | 297/330 X |

FOREIGN PATENT DOCUMENTS 59-149534 10/1984 Japan .

Primary Examiner—Peter A. Aschenbrenner
Assistant Examiner—Thomas A. Rendos
Attorney, Agent, or Firm—Gerald J. Ferguson, Jr.

[57] ABSTRACT

In a motor-driven seat, the seat cushion and the seat back are driven by a slider motor and a knuckle motor in response to operation of respective switches. The motor-driven seat is further provided with an additional driving circuit which is adapted to receive power from a power source other than the battery mounted on the vehicle body and drives the slider motor and the knuckle motor so that the seat back is inclined rearward in response to forward or rearward sliding movement of the seat.

18 Claims, 6 Drawing Sheets

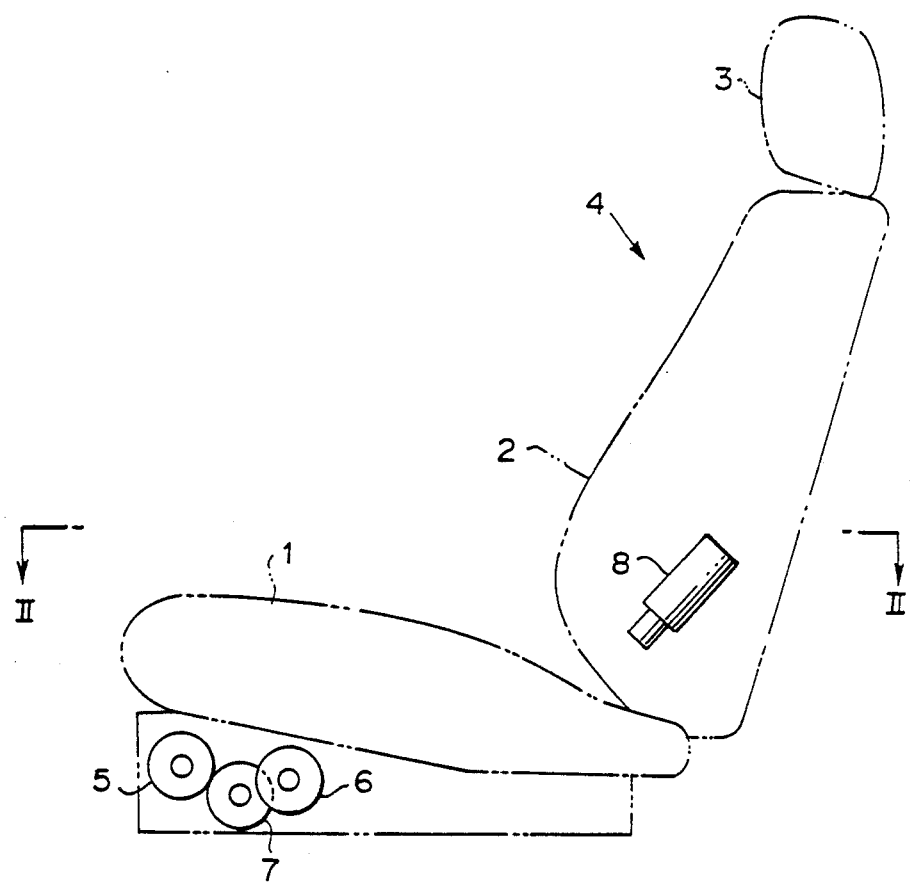
F I G .1

F I G.2
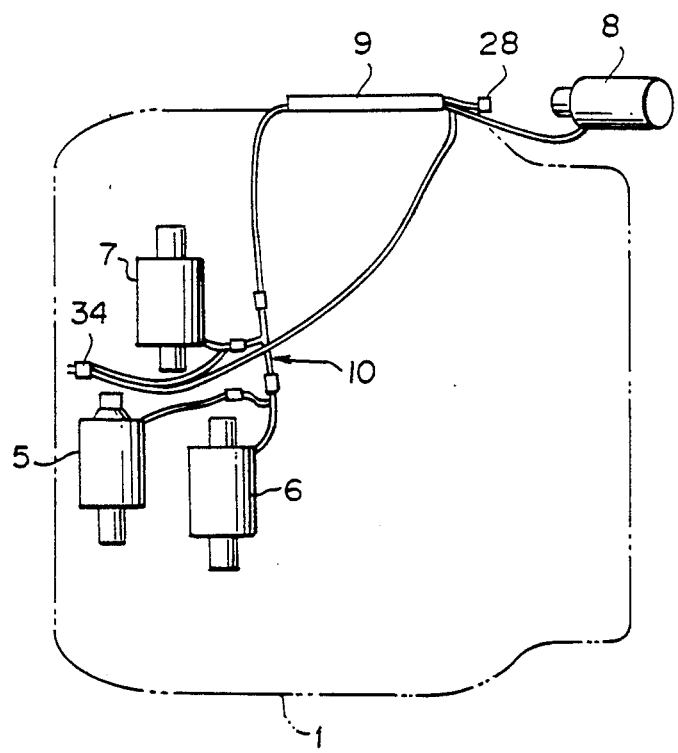

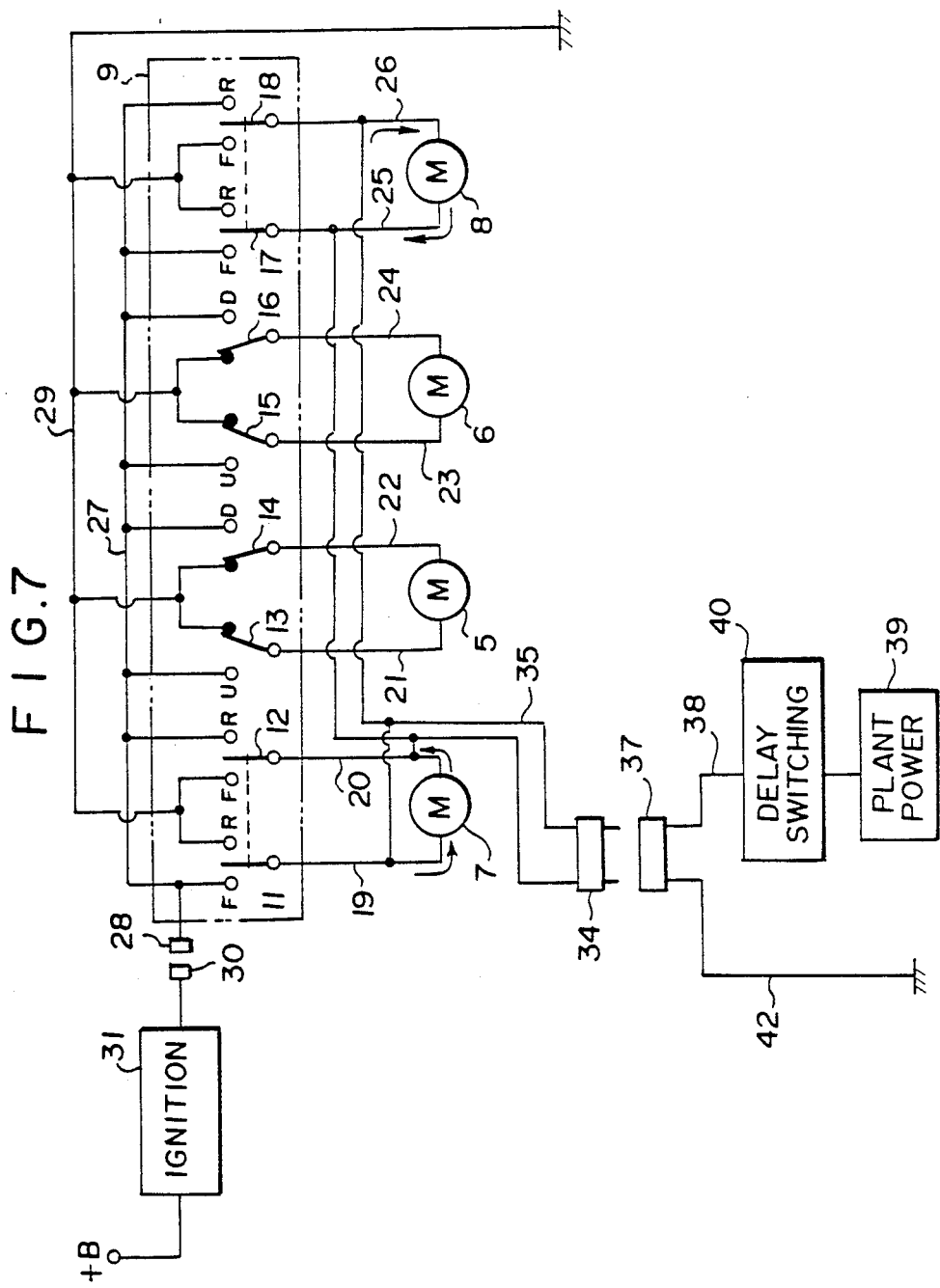

4,832,403

MOTOR-DRIVEN SEAT

BACKGROUND OF THE INVENTION

1. Field of the Invention

This invention relates to a motor-driven seat for a vehicle in which the seat cushion is slid back and forth and the inclination of the seat back is controlled under the force of an electric motor.

2. Description of the Prior Art

A motor-driven seat in which the seat cushion and the seat back are driven by a slider motor and a knuckle motor is disclosed in, for instance, Japanese Unexamined Utility Model Publication No. 59(1984)-149534. Generally, such a motor-driven seat is mounted on the vehicle body before the vehicle body is equipped with a battery and it is very difficult to manually move the seat cushion and the seat back. Accordingly, there has been a problem that working facility in the vehicle body is lowered after the seat is mounted.

For example, the seat is generally inserted into the vehicle body through an opening of the vehicle body to be closed and opened by a door with the seat back inclined forward since otherwise insertion of the seat is very difficult. However, when the seat back is inclined forward, the worker cannot position himself on the seat for working on the ceiling trim and the like.

SUMMARY OF THE INVENTION

In view of the foregoing observations and description, the primary object of the present invention is to provide a motor-driven seat which can improve working facility in the vehicle body after the vehicle body is equipped with the seat.

The motor-driven seat in accordance with the present invention is characterized by having an additional driving circuit which is adapted to receive power from a power source other than the battery mounted on the vehicle body and drives the slider motor and the knuckle motor so that the seat back is inclined rearward in response to forward or rearward sliding movement of the seat.

With this arrangement, the seat back can be inclined rearward in response to sliding movement of the seat by connecting the additional driving circuit to, for instance, the plant power source, whereby working facility is substantially improved.

BRIEF DESCRIPTION OF THE DRAWINGS

FIG. 1 is a schematic side view of a motor-driven seat assembly in accordance with an embodiment of the present invention, FIG. 2 is a schematic plan view as viewed in the direction of line II—II in FIG. 1, FIG. 7 is a view similar to FIG. 4 but for illustrating another embodiment of the present invention.

DESCRIPTION OF THE PREFERRED EMBODIMENT

Figure 3:
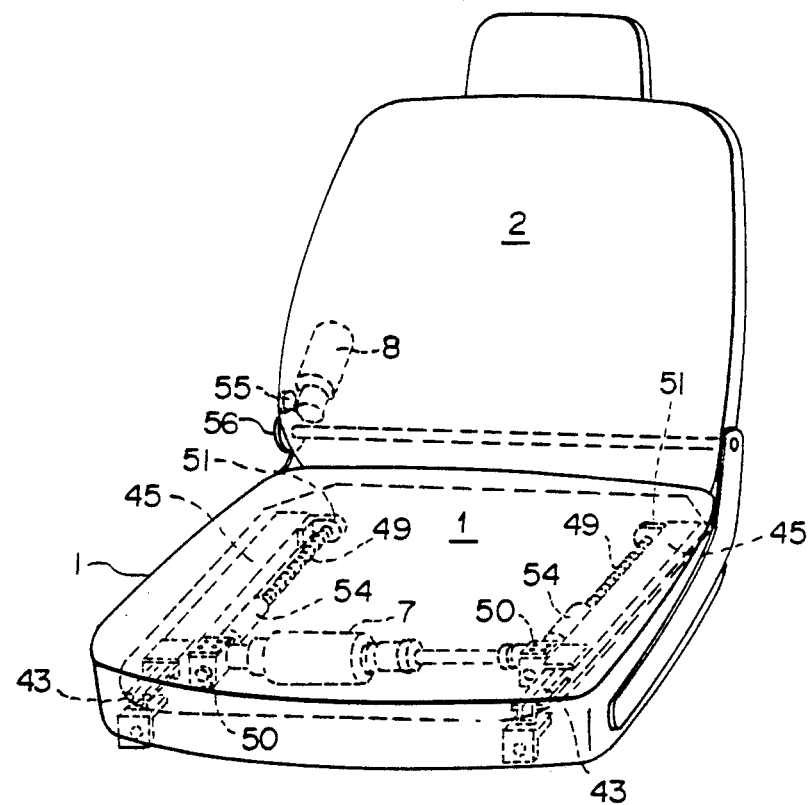
FIG. 3 is a schematic perspective view showing the mechanism for sliding the seat assembly and for controlling the inclination of the seat back, FIG. 4 a view showing the driving circuit of the motor-driven seat.

In FIGS. 1 to 3, a motor-driven seat in accordance with an embodiment of the present invention includes a seat assembly 4 comprising a seat cushion 1, a seat back 2 and a head rest 3. The seat back 2 is supported for swinging motion relative to the seat cushion 1. Below the seat cushion 1 are provided a front portion lift motor 5 for moving up and down the front portion of the seat cushion 1, a rear portion lift motor 6 for moving up and down the rear portion of the seat cushion 1, and a slider motor 7 for sliding the seat assembly 4 back and forth. A knuckle motor 8 for changing the inclination of the seat back 2 is provided on one side of the lower portion of the seat back 2. As the motors 5, 6 and 7, a reversible D.C. motor having a pair of output shafts is used. As the knuckle motor 8, a reversible D.C. motor having a single output shaft is used. Since the mechanism for controlling the inclination of the seat cushion 1 under the force of the front portion lift motor 5 and the rear portion lift motor 6 is known and has little to do with the present invention, it will not be described in detail here.

The mechanism for sliding the seat assembly 4 and for controlling the inclination of the seat back 2 is known per se, and will be briefly described with reference to FIG. 3, hereinbelow.

Figure 5:
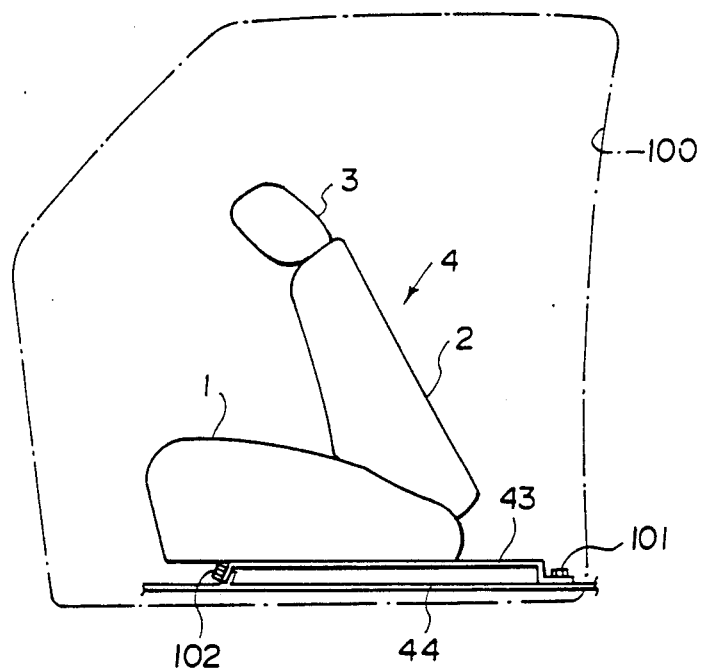
FIGS. 5 and 6 are views for illustrating the operation of the seat in accordance with the embodiment.

A pair of upper rails 45 is fixed on the lower surface of the seat cushion 1 to longitudinally extend on opposite sides thereof. The upper rails 45 are supported for sliding movement in the longitudinal direction of the vehicle body on a pair of lower rails 43 fixed to a floor panel 44 (FIG. 5). The slider motor 7 is connected to a pair of lead screws 49 by way of gear boxes 50. The gear boxes 50 are respectively supported on the upper rails 45. Each of the lead screws 49 is supported for rotation on the gear box 50 at one end and on a bracket 51 at the other end, the bracket 51 being mounted on the upper rail 45. A nut member 54 is fixed to the floor panel 44 and is engaged with each lead screw 49. Thus, when the slider motor 7 is energized and the lead screws 49 are rotated, the seat assembly 4 is slid back and forth.

The knuckle motor 8 is mounted on the seat back 2, and a gear 55 driven by the knuckle motor 8 is in mesh with a gear 56 supported on the seat cushion 1 so that the seat back 2 is swung back and forth in response to rotation of the knuckle motor 8.

Figure 4:
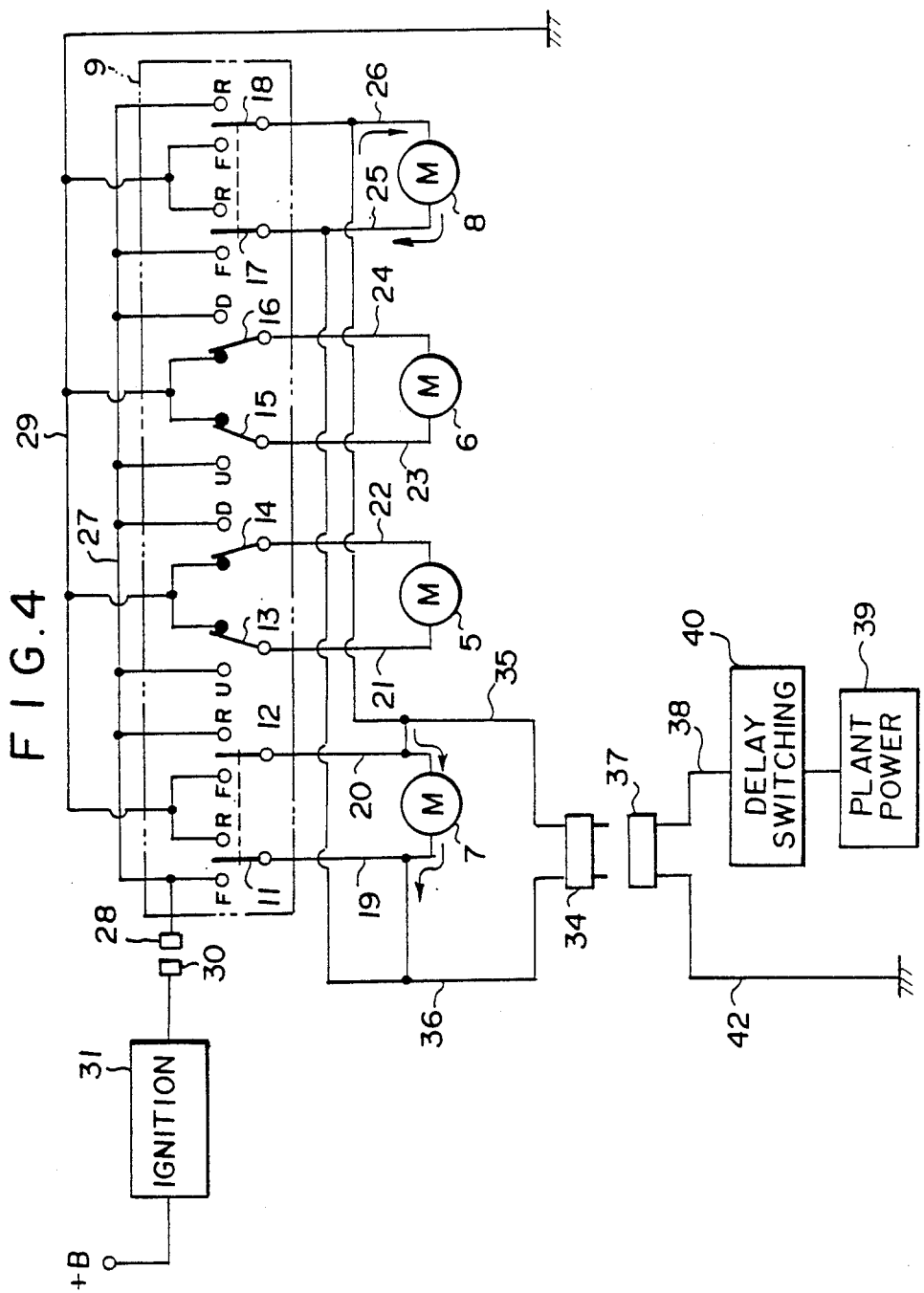

The motors 5 to 8 are connected together by a wire harness 10 by way of a switch unit 9 as shown in FIG. 2. FIG. 4 shows the circuitry for driving the motor-driven seat of this embodiment. As shown in FIG. 4, the switch unit 9 includes changeover switches 11 and 12 in the form of a gang switch, changeover switches 13 and 14, changeover switches 15 and 16, and changeover switches 17 and 18 in the form of a gang switch. The changeover switches 11 and 12 are for reversing the slider motor 7, the changeover switches 13 and 14 are for reversing the front portion lift motor 5, the changeover switches 15 and 16 are for reversing the rear portion lift motor 6 and the changeover switches 17 and 18 are for reversing the knuckle motor 8. The common terminals of the changeover switches 11 to 18 are connected to the corresponding motors 7, 5, 6 and 8 by way of lines 19 to 26.

In FIG. 4, the terminals of the changeover switches 11 and 12 indicated at F are those which are connected to the common terminals when the seat assembly 4 is to be moved forward and the terminals of the changeover switches 11 and 12 indicated at R are those which are connected to the common terminals when the seat assembly 4 is to be moved rearward. The terminal of the changeover switch 13 indicated at U is that which is connected to the common terminal when the front portion of the seat cushion 1 is to be lifted, and the terminal of the changeover switch 14 indicated at D is that which is connected to the common terminal when the front portion of the seat cushion 1 is to be moved downward. The terminal of the changeover switch 15 indicated at U is that which is connected to the common terminal when the rear portion of the seat cushion 1 is to be lifted, and the terminal of the changeover switch 16 indicated at D is that which is connected to the common terminal when the rear portion of the seat cushion 1 is to be moved downward. The terminals of the changeover switches 17 and 18 indicated at F are those which are connected to the common terminals when the seat back 2 is to be inclined forward and the terminals of the changeover switches 17 and 18 indicated at R are those which are connected to the common terminals when the seat back 2 is to be inclined rearward.

The F terminal of the changeover switch 11, the R terminal of the changeover switch 12, the U terminal of the changeover switch 13, the D terminal of the changeover switch 14, the U terminal of the changeover switch 15, the D terminal of the changeover switch 16, the F terminal of the changeover switch 17 and the R terminal of the changeover switch 18 are connected to a plug 28 by way of a positive line 27. The other terminals of the switch unit 9, that is, the R terminal of the changeover switch 11, the F terminal of the changeover switch 12, the normally closed terminals of the changeover switches 13, 14, 15 and 16, the R terminal of the changeover switch 17 and the F terminal of the changeover switch 18 are connected to earth by way of a negative line 29.

A plug socket 30 adapted to be mated with the plug 28 is connected to a battery B by way of an ignition switch 31. The driving system described above is for driving the motors 5 to 8 by power supplied from the onboard battery in response to operation of the changeover switches 11 to 18.

The circuitry for driving the motor-driven seat of this embodiment is further provided with an additional driving system which receives power from a power source other than the onboard battery, e.g., the plant power source, during fitting out of the vehicle, and drives the knuckle motor 8 to incline rearward the seat back 2 in response to the driving of the slider motor 7 to slide rearward the seat assembly.

As shown by the thick line in FIG. 4, a positive line 35 connected to a plug 34 at one end is connected to the slider motor 7 and the knuckle motor 8 by way of the lines 20 and 26, and a negative line 36 connected to the plug 34 at one end is connected to the slider motor 7 and the knuckle motor 8 by way of the lines 19 and 25. A plug socket 37 to be mated with the plug 34 is connected to the plant power supply by way of a positive line 38 and a normally closed delay switching circuit 40, and to earth by way of an earth line 42.

When the plug 34 is mated with the plug socket 37, an electric current is supplied to the slider motor 7 and the knuckle motor 8 in the direction shown by the arrows in FIG. 3, whereby the slider motor 7 drives rearward the seat assembly 4 and the knuckle motor 8 drives the seat back 2 to incline rearward.

Operation of the motor-driven seat will now be described, hereinbelow.

When the vehicle body is equipped with the motor-driven seat, the seat is inserted into the passenger compartment through an opening 100 which is to be opened and closed by a door (not shown) with the seat back 2 being inclined forward onto the seat cushion 1 and the seat assembly 4 being positioned in the frontmost position relative to the lower rail 43 as shown in FIG. 5, and the rear end portion of the lower rail 43 is fixed to the floor panel 44 by bolts 101.

When the plug 34 is subsequently mated with the plug socket 37, the seat assembly is slid rearward and the seat back 2 is inclined rearwardly in the manner described above as shown in FIG. 6. A predetermined time after, the timer (not shown) in the normally closed delay switching circuit 40 breaks the additional driving circuit.

Figure 6:
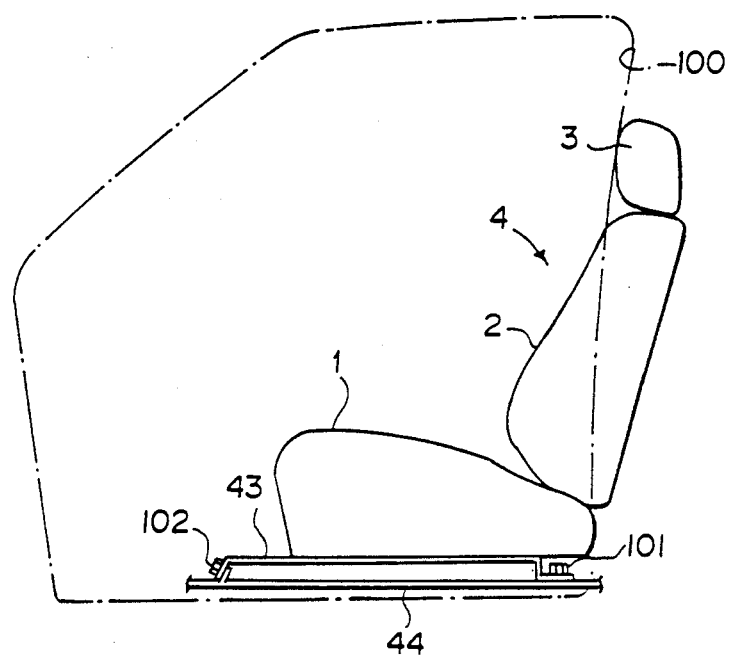

In the state shown in FIG. 6, the front end portion of the lower rail 43 is fixed to the floor panel 44 by bolts 102. Further, in this state, the worker can sit on the seat to work on the ceiling trim and the like, whereby working facility in the vehicle body after the vehicle body is equipped with the seat can be substantially improved.

Though in the embodiment described above, the motor-driven seat is inserted into the passenger compartment with the seat assembly 4 being positioned in the frontmost position relative to the lower rail 43, the seat may be inserted into the passenger compartment with the seat assembly 4 being positioned in the rearmost position relative to the lower rail 43. In this case, the additional driving circuit is arranged to incline rearward the seat back 2 in response to forward movement of the seat assembly 4 as shown in FIG. 7.

Further instead of the normal delay switching circuit 40, other circuit breaking means such as a limit switch may be used.

I claim:

1. A motor-driven seat for a vehicle comprising a seat assembly consisting of a seat cushion and a seat back, a seat sliding mechanism supporting the seat assembly for back and forth sliding movement, a slider motor for driving the seat sliding mechanism, a seat reclining mechanism supporting the seat back so that the inclination of the seat back relative to the seat cushion can be changed, a knuckle motor for driving the reclining mechanism, and a driving circuit which receives power from a battery mounted on the vehicle body and selectively energizes the slider motor and the knuckle motor in response to operation of respective switching means, wherein the improvement comprises an additional driving circuit which is adapted to receive power from a power source other than the battery mounted on the vehicle body to drive both the slider motor and the knuckle motor so that the seat back is inclined rearward as the seat assembly slides forward or rearward.

2. A motor-driven seat as defined in claim 1 in which said additional driving circuit energizes the slider motor to slide the seat assembly forward.

3. A motor-driven seat as defined in claim 1 in which said additional driving circuit energizes the slider motor to slide the seat assembly rearward.

4. A motor-driven seat as defined in claim 1 in which said additional driving circuit has a connector which is adapted to be connected to the plant power source when the seat is mounted on the vehicle body.

5. A motor-driven seat as defined in claim 4 in which a switching circuit for energizing the slider motor and the knuckle motor until the seat cushion and the seat back are moved to predetermined positions when the connector is connected to the plant power source is provided between the plant power source and the motors.

6. A motor-driven seat as defined in claim 5 in which said switching circuit comprises a timer.

7. A motor-driven seat as defined in claim 5 in which said switching circuit is provided between the connector and the plant power source.

8. A motor-driven seat for a vehicle comprising a seat assembly consisting of a seat cushion and a seat back, a seat sliding mechanism supporting the seat assembly for back and forth sliding movement, a slider motor for driving the seat sliding mechanism, a seat reclining mechanism supporting the seat back so that the inclination of the seat back relative to the seat cushion can be changed, a knuckle motor for driving the reclining mechanism, and a driving circuit having a first connector adapted to be connected to a battery mounted on the vehicle body and a second connected adapted to be connected to a plant power source during installation of the seat on the vehicle body, the driving circuit being arranged to drive at least the knuckle motor such that the seat back inclines rearward when an electric current is supplied through the second connector.

9. A motor-driven seat as defined in claim 8 in which said driving circuit drives the knuckle motor and the slider motor when an electric current is supplied through the second connector.

10. A motor-driven seat as defined in claim 9 in which said driving circuit drives the slider motor to move rearward the seat assembly when an electric current is supplied through the second connector.

11. A motor-driven seat as defined in claim 9 in which said driving circuit drives the slider motor to move forward the seat assembly when an electric current is supplied through the second connector.

12. A motor-driven seat as defined in claim 8 further comprising a mating connector adapted to be mated with the second connector, and a switching circuit for connecting the mating connector and the plant power source.

13. A motor-driven seat as defined in claim 12 in which said switching circuit includes a timer which closes the switching circuit for a predetermined time and breaks the same thereafter.

14. A motor-driven seat for a vehicle comprising a seat assembly consisting of a seat cushion and a seat back, a seat sliding mechanism supporting the seat assembly for back and forth sliding movement, a slider motor for driving the seat back so that the inclination of the seat back relative to the seat cushion can be changed, a knuckle motor for driving the reclining mechanism, and a driving circuit having a first connector adapted to be connected to a battery mounted on the vehicle body and a second connector adapted to be connected to a plant power source during mounting of the seat on the vehicle body, the driving circuit being arranged to drive the slider motor when electric current is supplied through the second connector.

15. A motor-driven seat as defined in claim 14 in which said driving circuit drives the slider motor to move forward the seat assembly when electric current is supplied through the second connector.

16. A motor-driven seat as defined in claim 14 in which said driving circuit drives the slider motor to move rearward the seat assembly when electric current is supplied to the second connector.

17. A motor-driven seat as defined in claim 14 further comprising an mating connector adapted to be mated with the second connector, and a switching circuit for connecting the mating connector and the power plant source.

18. A motor-driven seat as defined in claim 17 in which said switching circuit includes a timer which closes the switching circuit for a predetermined time and breaks the switching circuit thereafter.

* * * * *